United States Patent
Nakamura et al.

(10) Patent No.: US 9,783,451 B2
(45) Date of Patent: *Oct. 10, 2017

(54) GLASS COMPOSITION, GLASS COMPOSITION FOR CHEMICAL STRENGTHENING, STRENGTHENED GLASS ARTICLE, AND COVER GLASS FOR DISPLAY

(71) Applicant: Nippon Sheet Glass Company, Limited, Tokyo (JP)

(72) Inventors: Aya Nakamura, Tokyo (JP); Junji Kurachi, Tokyo (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 70 days.

This patent is subject to a terminal disclaimer.

(21) Appl. No.: 14/766,353

(22) PCT Filed: Feb. 6, 2014

(86) PCT No.: PCT/JP2014/000647
§ 371 (c)(1),
(2) Date: Aug. 6, 2015

(87) PCT Pub. No.: WO2014/122935
PCT Pub. Date: Aug. 14, 2014

(65) Prior Publication Data
US 2015/0376050 A1    Dec. 31, 2015

(30) Foreign Application Priority Data
Feb. 7, 2013    (JP) .................. 2013-022113

(51) Int. Cl.
C03C 3/085    (2006.01)
C03C 3/087    (2006.01)
C03C 21/00    (2006.01)
C03C 3/093    (2006.01)

(52) U.S. Cl.
CPC ............. C03C 3/085 (2013.01); C03C 3/087 (2013.01); C03C 3/093 (2013.01); C03C 21/002 (2013.01)

(58) Field of Classification Search
CPC ....... C03C 3/085; C03C 21/00; C03C 21/001; C03C 21/002
See application file for complete search history.

(56) References Cited

U.S. PATENT DOCUMENTS

| | | | |
|---|---|---|---|
| 8,840,997 B2 | 9/2014 | Koyama et al. | |
| 2012/0083401 A1 | 4/2012 | Koyama et al. | |
| 2012/0171497 A1 | 7/2012 | Koyama et al. | |
| 2013/0295366 A1 | 11/2013 | Murata et al. | |
| 2015/0147538 A1 | 5/2015 | Ishimaru et al. | |
| 2015/0376050 A1 | 12/2015 | Nakamura et al. | |

FOREIGN PATENT DOCUMENTS

| | | |
|---|---|---|
| CN | 102417301 | 4/2012 |
| JP | 2000-319036 | 11/2000 |
| JP | 2010-116276 | 5/2010 |
| JP | 2010-527892 | 8/2010 |
| JP | 2012-148955 | 8/2012 |
| JP | 2012148908 | 8/2012 |
| JP | 2012-214356 | 11/2012 |
| JP | 2013-193887 | 9/2013 |
| JP | 2013193887 | 9/2013 |
| JP | 5376032 B | 12/2013 |
| WO | 2008/143999 | 11/2008 |
| WO | 2013176150 | 11/2013 |

OTHER PUBLICATIONS

Machine Translation of CN 102417301 A, Apr. 18, 2012.*
Machine Translation of JP 2000-319036 A, Nov. 21, 2000.*
Machine Translation of JP 2013-193887 A, Sep. 30, 2013.*

* cited by examiner

*Primary Examiner* — Elizabeth A Bolden
(74) *Attorney, Agent, or Firm* — Hamre, Schumann, Mueller & Larson, P.C.

(57) ABSTRACT

Provided is a glass composition containing, in mol %: 56 to 66% $SiO_2$; 6 to 12% $Al_2O_3$; 5 to 14% MgO; 0 to 1% CaO; 17 to 24% $Na_2O$; and 0 to 3% $K_2O$. The total content of $Li_2O$, $Na_2O$, and $K_2O$ is in a range of 18.5 to 24%. This glass composition is suitable for production by a float process and for introduction of a compressive stress layer with a high crack initiation load, a high surface compressive stress, and a large thickness by chemical strengthening.

13 Claims, No Drawings

GLASS COMPOSITION, GLASS COMPOSITION FOR CHEMICAL STRENGTHENING, STRENGTHENED GLASS ARTICLE, AND COVER GLASS FOR DISPLAY

TECHNICAL FIELD

The present invention relates to a glass composition suitable for chemical strengthening, more specifically to a glass composition having properties suitable for use as a cover glass of a display. The present invention also relates to a glass composition for chemical strengthening, a chemically-strengthened strengthened glass article, and a cover glass for a display.

BACKGROUND ART

In recent years, electronic devices with liquid crystal displays, organic EL displays, etc. and electronic devices with touch panel displays have been widespread. Since glass materials have high surface hardness, they are widely used as materials of cover glasses of displays of these electronic devices. Cover glasses of displays are sometimes chemically strengthened to improve their mechanical strength.

Chemical strengthening is a technique of replacing alkali metal ions contained in the glass surface by monovalent cations having a larger ionic radius so as to form a compressive stress layer on the glass surface. Chemical strengthening is often performed by replacing lithium ions ($Li^+$) by sodium ions ($Na^+$) or by replacing sodium ions by potassium ions ($K^+$).

A glass composition suitable for chemical strengthening disclosed in Patent Literature 1 contains 64 to 68 mol % $SiO_2$, 12 to 16 mol % $Na_2O$, and 8 to 12 mol % $Al_2O_3$. In this glass composition, the content of $Na_2O$ is higher than that of $Al_2O_3$ by 2 to 6 mol %, and the total content of alkaline earth metal oxides ($MgO+CaO+SrO$) is adjusted to 5 to 8 mol % (claim 1). In addition, the glass composition described in Patent Literature 1 has a melting temperature of less than 1650° C. and a liquidus viscosity of at least 13 kPa·s to be adapted to a down-draw process. In the glass compositions described as examples in Patent Literature 1, the contents of $Al_2O_3$ and $Na_2O$ are 8.9 mol % or more and 14.38 mol % or less, respectively.

A strengthened glass substrate suitable for use in a touch panel display disclosed in Patent Literature 2 contains, in mass %, 45 to 75% $SiO_2$, 1 to 30% $Al_2O_3$, 0 to 20% $Na_2O$, and 0 to 20% $K_2O$ (claim 3). Furthermore, in the examples, the temperatures at which the glass substrates have a viscosity of $10^4$ dPa·s are 1122° C. to 1414° C. These glass substrates are suitable for production by a down-draw process.

A working temperature and a melting temperature are known measures of the high-temperature viscosity of glass. In a float process, the working temperature is a temperature at which glass has a viscosity of $10^4$ dPa·s, and hereinafter may be referred to as $T_4$. The melting temperature is a temperature at which glass has a viscosity of $10^2$ dPa·s, and hereinafter may be referred to as $T_2$.

CITATION LIST

Patent Literature

Patent Literature 1: JP 2010-527892 T
Patent Literature 2: JP 2010-116276 A

SUMMARY OF INVENTION

Technical Problem

Glass compositions having a low $T_2$ and a low $T_4$, in particular, glass compositions having a low $T_4$ are suitable for production by the float process. On the other hand, glass compositions for chemical strengthening are expected to be susceptible to ion exchange by replacement of cations so as to introduce a compressive stress layer with a high crack initiation load, a high surface compressive stress, and a large thickness.

In view of the above circumstances, it is an object of the present invention to provide a glass composition suitable for production by a float process and for introduction of a compressive stress layer with a high crack initiation load, a high surface compressive stress, and a large thickness by chemical strengthening.

Solution to Problem

In order to achieve the above object, the present invention provides a glass composition containing, in mol %: 56 to 66% $SiO_2$; 6 to 12% $Al_2O_3$; 5 to 14% MgO; 0 to 1% CaO; 17 to 24% $Na_2O$; and 0 to 3% $K_2O$. The total content of $Li_2O$, $Na_2O$, and $K_2O$ is in a range of 18.5 to 24%.

In another aspect, the present invention provides a strengthened glass article including a compressive stress layer formed as a surface of the strengthened glass article by bringing a glass article containing the glass composition of the present invention into contact with a molten salt containing monovalent cations having an ionic radius larger than that of sodium ions so as to allow ion exchange to take place between sodium ions contained in the glass composition and the monovalent cations.

The present invention further provides a cover glass for a display, the cover glass including the strengthened glass article of the present invention.

Advantageous Effects of Invention

The glass composition according to the present invention has a relatively low $T_4$ and thus is suitable for production by the float process. Furthermore, the glass composition of the present invention is suitable for obtaining a strengthened glass article having a compressive stress layer with a high crack initiation load, a large thickness, and a high surface compressive stress.

DESCRIPTION OF EMBODIMENTS

Hereinafter, the percentages of the components of glass compositions are all expressed in mol %, unless otherwise specified. In this description, the phrase "consisting essentially of components" means that the total content of the components referred to is 99.5 mol % or more, preferably 99.9 mol % or more, and more preferably 99.95 mol % or more. The phrase "being substantially free of a component" means that the content of the component is 0.1 mol % or less, and preferably 0.05 mol % or less.

The glasses disclosed in Patent Literature 1 and Patent Literature 2 have high high-temperature viscosities and high $T_4$ values. A high $T_4$ value is disadvantageous in producing a cover glass of a display by the float process, and is also disadvantageous in forming glass into a thin sheet as a cover glass of a display.

The present invention is intended to reduce the $T_4$ by a thorough study of, in particular, the contents of $Al_2O_3$, $Na_2O$, alkaline earth oxides, and alkali metal oxides in view of the effects of each of these oxides on the properties and by an overall adjustment of the contents of the other components, and thereby to provide a glass composition suitable for production by the float process, in particular, a glass composition advantageous in forming glass into a thinner sheet (for example, with a thickness of 1 mm or less) as a cover glass for a display and resistant to scratching and cracking.

The following points are not essential in the present invention. However, in the present invention, attention can be given to the following points in some cases.

The present invention is intended to provide a glass composition having a relatively low $T_2$ so as to be adapted to a glass melting furnace used in conventional production facilities for the float process. The present invention is also intended to provide a glass composition in which a value obtained by subtracting the liquidus temperature TL from the $T_4$ is a not too large negative value or a positive value (for example, −10° C. or more, preferably 0° C. or more, and more preferably 10° C. or more) so as to be adapted to glass formation by the float process.

Hereinafter, the components of the glass composition of the present invention are described respectively.

($SiO_2$)

$SiO_2$ is the main component of a glass composition. An excessively low content of $SiO_2$ reduces the chemical durability such as water resistance and heat resistance of the glass. On the other hand, an excessively high content of $SiO_2$ increases the viscosity of the glass composition at high temperatures and thus makes it difficult to melt and form the glass composition. Therefore, the appropriate content of $SiO_2$ is in a range of 56 to 66%. The content of $SiO_2$ is preferably 57 to 64%, and more preferably 57 to 62%.

($Al_2O_3$)

$Al_2O_3$ improves the chemical durability such as water resistance of a glass composition and further facilitates migration of alkali metal ions in the glass. $Al_2O_3$ is also a component that contributes to maintaining the strength obtained by chemical strengthening. On the other hand, an excessively high content of $Al_2O_3$ increases the viscosity of the glass melt, and thus increases the $T_2$ and $T_4$ and reduces the clarity of the glass melt, which makes it difficult to produce a high quality glass sheet.

Therefore, the appropriate content of $Al_2O_3$ is in a range of 6 to 12%. The content of $Al_2O_3$ is preferably 11% or less, and more preferably 10% or less. The content of $Al_2O_3$ is preferably 7% or more, and more preferably 8% or more.

As for the contents of $SiO_2$ and $Al_2O_3$, the glass compositions close to and including the glass composition of the present invention have the following features.

In order to produce a glass sheet by the float process and to perform chemical strengthening treatment at a relatively low temperature and in a short time, a glass composition needs to contain a certain amount of $Na_2O$. Therefore, the glass composition of the present invention contains 17% or more $Na_2O$.

On the other hand, it was found that the glass compositions can be classified into two groups according to the following parameters of glass articles obtained by chemical strengthening: the surface compressive stress and the depth of the compressive stress layer; and the crack initiation load defined as an indentation load at which cracks emanating from an indentation formed by a Vickers indenter occur with a probability of 50%.

The first group of glass compositions include those that can provide a surface compressive stress of 750 MPa or more after any of chemical strengthening treatments that were performed thereon. In the first group of glass compositions, there is no correlation between the surface compressive stress and the depth of the compressive stress layer and the crack initiation load of the chemically-strengthened glass article, which reveals that the crack initiation load of the glass article is determined solely by the glass composition thereof.

The second group of glass compositions include those that can provide a surface compressive stress of less than 750 MPa after any of chemical strengthening treatments that were performed thereon. In the second group of glass compositions, there is a strong positive correlation between the crack initiation load of the chemically-strengthened glass article and the surface compressive stress, and thus the crack initiation load decreases rapidly as the surface compressive stress decreases. In addition, in all the glass compositions belonging to the second group, the crack initiation load had very low values.

In the present invention, based on the above-described findings, a glass composition belonging to the above-mentioned first group and having a $SiO_2$ content of 66% or less and an $Al_2O_3$ content of 6% or more was selected. With the use of the glass composition of the present invention in which the contents of $SiO_2$ and $Al_2O_3$ satisfy the above conditions and the contents of the other components are appropriately adjusted, it is possible to obtain a strengthened glass article having a compressive stress layer with a surface compressive stress of 900 MPa or more, a crack initiation load of 3.9 kgf or more, and a thickness of 25 μm or more, and even a strengthened glass article having a compressive stress layer with a surface compressive stress of 1000 MPa or more and a depth of 30 μm or more.

However, there is a positive correlation between the difference obtained by subtracting the content of $Al_2O_3$ from the content of $SiO_2$ ($Si_2$—$Al_2O_3$) and acid resistance of the glass composition. When a glass article having a low acid resistant glass composition is immersed in an acid solution such as an aqueous hydrofluoric acid solution, the surface of the glass article is damaged, regardless of whether it is subjected to chemical strengthening treatment or not. In view of this, in the glass composition of the present invention, the content of $SiO_2$ is 56% or more and the content of $Al_2O_3$ is 12% or less.

($Na_2O$)

$Na_2O$ is a component that increases the surface compressive stress and thus increases the depth of the surface compressive stress layer when sodium ions are replaced by potassium ions. However, if the content of $Na_2O$ is higher than the appropriate content thereof, the surface compressive stress relaxed in the chemical strengthening treatment is greater than the stress produced by ion exchange in the chemical strengthening treatment, and as a result, the surface compressive stress is likely to decrease.

$Na_2O$ is a component that increases the meltability and reduces the $T_4$ and $T_2$. On the other hand, an excessively high content of $Na_2O$ significantly reduces the water resistance of glass.

Therefore, in the glass composition of the present invention, the appropriate content of $Na_2O$ is in a range of 17 to 24%. The content of $Na_2O$ is preferably 18.5% or more, and more preferably 19% or more. The content of $Na_2O$ is preferably 22% or less, and more preferably 21% or less. However, in order to ensure reduction of the $T_4$, etc., the content of $Na_2O$ may be 22% or more depending on the contents of the other components.

(MgO)

MgO is most effective in increasing the meltability of glass in alkaline earth oxides (RO components). In order to obtain this effect sufficiently, in the glass composition of the present invention, the content of MgO is 5% or more. On the other hand, an excessively high content of MgO beyond its appropriate content rapidly reduces the strengthening effects obtained by chemical strengthening, in particular, the depth of the surface compressive stress layer, and also reduces the crack initiation load. Among the RO components, MgO is least likely to have these negative effects, but in the glass composition of the present invention, the content of MgO is 14% or less. In addition, a high content of MgO increases the liquidus temperature TL of the glass composition.

Therefore, in the glass composition of the present invention, the content of MgO is in a range of 5 to 14%. The content of MgO is preferably 7% or more, and more preferably 8% or more. The content of MgO is preferably 12% or less, and more preferably 11% or less.

(CaO)

CaO has the effect of reducing the viscosity at high temperatures. However, an excessively high content of CaO inhibits migration of sodium ions in a glass composition and makes the glass composition more susceptible to devitrification. However, it is preferable to add CaO because a small amount of CaO is effective in lowering the liquidus temperature TL.

Therefore, the appropriate content of CaO is in a range of 0 to 1%. The content of CaO is preferably 0.7% or less, and more preferably 0.5% or less. The content of CaO may be 0.3% or more.

(SrO and BaO)

SrO and BaO are more effective than CaO in significantly reducing the viscosity of a glass composition and reducing the liquidus temperature TL of the glass composition, if their contents are low. Even if the contents of SrO and BaO are very low, they significantly inhibit migration of sodium ions in the glass composition and has a significant negative effect on both the surface compressive stress and the depth of the compressive stress layer.

Therefore, it is preferable that the glass composition of the present invention be substantially free of SrO and BaO.

($K_2O$)

Like $Na_2O$, $K_2O$ is a component that increases the meltability of glass. A low content of $K_2O$ increases the ion exchange rate in chemical strengthening, increases the depth of the compressive stress layer, and at the same time lowers the devitrification temperature TL of a glass composition. Therefore, it is preferable that the glass composition have a low content of $K_2O$.

On the other hand, $K_2O$ impairs the clarity of glass melt compared to $Na_2O$. An excessively high content of $K_2O$ is more likely to reduce the crack initiation load after chemical strengthening. In addition, as the content of $K_2O$ increases, a molten salt used in chemical strengthening decomposes and the chemical strengthening effect is more likely to decrease accordingly.

Therefore, the appropriate content of $K_2O$ is in a range of 0 to 3%. The content of $K_2O$ is preferably 1.5% or less, and more preferably 1% or less. The content of $K_2O$ may be 0.2% or more, and even 0.5% or more.

($Li_2O$)

$Li_2O$ significantly reduces the depth of a compressive stress layer even if the content of $Li_2O$ is very low. When a glass article containing $Li_2O$ is subjected to chemical strengthening treatment in a molten salt of potassium nitrate alone, the molten salt decomposes at a much higher rate than in the case of a glass article free of $Li_2O$. Specifically, in the case where the chemical strengthening treatment is performed repeatedly using the same molten salt, the quality of the properties obtained by chemical strengthening degrade more rapidly, that is, the quality of the properties obtained degrade with fewer repetitions of the treatment. Therefore, it is preferable that the glass composition of the present invention be substantially free of $Li_2O$.

($R_2O$)

$R_2O$ refers to $Li_2O$, $Na_2O$, and $K_2O$. If the content of $R_2O$ is too low, the amount of the components that reduce the viscosity of a glass composition is too small, which makes it difficult to melt the glass composition. On the other hand, when the glass composition of the present invention is subjected to chemical strengthening, ions derived from the molten salt diffuse into the glass to produce a compressive stress, but the compressive stress is likely to relax and decrease due to the relaxation of the glass structure, depending on the balance between the content of $R_2O$ and the contents of $Al_2O_3$ and MgO. In order to minimize this negative effect, the upper limit is put on the content of $R_2O$ in the glass composition of the present invention.

Therefore, the appropriate content of $R_2O$ (appropriate total content of $Li_2O$, $Na_2O$, and $K_2O$) is in a range of 18.5 to 24%. The content of $R_2O$ is preferably 19% or more, and preferably 22% or less. However, in order to ensure reduction of the $T_4$, etc., the content of $R_2O$ may be 22% or more depending on the contents of the other components.

($B_2O_3$)

$B_2O_3$ is a component that reduces the viscosity of a glass composition and improves the meltability thereof. However, an excessively high content of $B_2O_3$ makes the glass composition more susceptible to phase separation and reduces the water resistance of the glass composition. In addition, compounds formed from $B_2O_3$ and alkali metal oxides may vaporize and damage the refractory material of a glass melting chamber. Furthermore, the addition of $B_2O_3$ causes a decrease in the depth of the compressive stress layer formed by chemical strengthening. Therefore, the appropriate content of $B_2O_3$ is 3% or less. In the present invention, it is more preferable that the glass composition be substantially free of $B_2O_3$.

($Fe_2O_3$)

Fe is normally present in the form of $Fe^{2+}$ or $Fe^{3+}$ in glass. $Fe^{3+}$ is a component that improves the ultraviolet ray absorbing properties of glass, and $Fe^{2+}$ is a component that improves the heat ray absorbing properties of glass. However, when the glass composition is used for a cover glass of a display, it is preferable to minimize the content of Fe to prevent the glass composition from being conspicuously colored. Fe may be inevitably mixed in the glass composition due to an industrial raw material, but it is recommended that the content of total iron oxide be 0.1% or less, and preferably 0.02% or less, as calculated in terms of $Fe_2O_3$ content. In the present invention, the glass composition may be substantially free of iron oxide.

($TiO_2$)

$TiO_2$ is a component that reduces the viscosity of a glass composition and increases the surface compressive stress produced by chemically strengthening. However, a high content of $TiO_2$ colors the glass composition yellow, which is not desired. Therefore, the appropriate content of $TiO_2$ is 0 to 1%. There may be a case where $TiO_2$ is inevitably mixed in the glass composition due to an industrial raw material and the glass composition contains 0.05% $TiO_2$, but this low content of $TiO_2$ does not cause undesirable coloring.

($ZrO_2$)

$ZrO_2$ is a component that increases the water resistance of glass and further increases the surface compressive stress produced by chemically strengthening. However, a high content of $ZrO_2$ may cause a rapid increase in the liquidus temperature TL. Therefore, the appropriate content of $ZrO_2$ is 0 to 1%. In the present invention, the glass composition may be substantially free of $ZrO_2$.

($SO_3$)

In the float process, a sulfate such as sodium sulfate ($Na_2SO_4$) is widely used as a refining agent. A sulfate is decomposed in molten glass to produce a gas component, which promotes degassing of the glass melt, but a portion of the gas component is dissolved in the form of $SO_3$ and remains in the glass composition. In the glass composition of the present invention, the content of $SO_3$ is preferably 0.1 to 0.3%.

($SnO_2$)

It is known that, in formation of a glass sheet by the float process, molten tin in a tin bath diffuses into the glass in contact with the tin bath so as to be present in the form of $SnO_2$. $SnO_2$ also contributes to degassing when it is mixed as one of the glass raw materials. In the glass composition of the present invention, the content of $SnO_2$ is preferably 0 to 0.4%.

(Other Components)

Preferably, the glass composition of the present invention consists essentially of the components (from $Al_2O_3$ to $SnO_2$) mentioned above. The glass composition of the present invention may contain components other than the above-mentioned components. In this case, the content of each of the other components is preferably less than 0.1%.

Examples of the other components that the glass composition may contain include $As_2O_5$, $Sb_2O_5$, $CeO_2$, Cl, and F in addition to the above-mentioned $SO_3$ and $SnO_2$. These components are added to degas the molten glass. However, it is preferable not to add $As_2O_5$, $Sb_2O_5$, Cl, and F because they have serious adverse effects on the environment. Other examples of the components that the glass composition may contain include ZnO, $P_2O_5$, $GeO_2$, $Ga_2O_3$, $Y_2O_3$, and $La_2O_3$. The glass composition may contain components other than the above-mentioned components derived from industrially available raw materials, unless the content of each of these components exceeds 0.1%. Since these components are optionally added if necessary or are inevitably mixed, the glass composition of the present invention may be substantially free of these components.

Hereinafter, the properties of the glass composition of the present invention are described.

(Glass Transition Temperature: Tg)

According to the present invention, it is possible to provide a glass composition having a glass transition temperature (Tg) of 610° C. or less, further 590° C. or less, or even 570° C. or less in some cases, and thus it is easier to slowly cool molten glass to produce the glass composition. The lower limit of the glass transition temperature is not particularly limited, and it may be 530° C. or more, preferably 550° C. or more to prevent relaxation of the compressive stress produced by ion exchange.

(Working Temperature: $T_4$)

In the float process, the viscosity of molten glass is adjusted to about $10^4$ dPa·s ($10^4$ P) when the molten glass in a melting furnace is poured into a float bath. In the production by the float process, it is preferable that the temperature (working temperature: $T_4$) at which the molten glass has a viscosity of $10^4$ dPa·s be lower. For example, in order to form the glass into a thin sheet for use as a cover glass of a display, the working temperature $T_4$ of the molten glass is preferably 1100° C. or less. According to the present invention, it is possible to provide a glass composition having a $T_4$ of 1090° C. or less, further 1075° C. or less, or even 1060° C. or less in some cases and thus suitable for production by the float process. The lower limit of the $T_4$ is not particularly limited, and it is 1000° C., for example.

(Melting Temperature: $T_2$)

When the temperature (melting temperature: $T_2$) at which the molten glass has a viscosity of $10^2$ dPa·s is low, the amount of energy required to melt the glass raw materials can be reduced, and the glass raw materials can be more easily dissolved to promote degassing and refining of the glass melt. According to the present invention, it is possible to reduce the $T_2$ to 1550° C. or less, and even 1530° C. or less.

(Difference Between Working Temperature and Liquidus Temperature: $T_4$-TL)

In the float process, it is preferable that molten glass does not devitrify when the temperature of the molten glass is $T_4$. In other words, it is preferable that the difference between the working temperature ($T_4$) and the liquidus temperature (TL) be large. According to the present invention, it is possible to provide a glass composition in which a difference obtained by subtracting the liquidus temperature from the working temperature is as large as −10° C. or more, and even 0° C. or more. In addition, according to the present invention, it is possible to reduce the TL to 1050° C. or less, and even 1000° C. or less so as to contribute to increasing the difference $T_4$-TL.

(Density (Specific Gravity): d)

It is desirable that a cover glass of a display for an electronic device have a low density to reduce the weight of the electronic device. According to the present invention, it is possible to reduce the density of the glass composition to 2.53 g·cm$^{-3}$ or less, further 2.51 g·cm$^{-3}$ or less, and even 2.50 g·cm$^{-3}$ or less in some cases.

In the float process or the like, when production of glass is changed from one type of glass to another type of glass, if there is a large difference in the density between these two types of glass, a portion of one type of glass having a higher density melts and remains at the bottom of a melting furnace, which may affect the changeover to production of another type of glass. The density of soda lime glass, which is currently mass-produced by the float process, is about 2.50 g·cm$^{-3}$. Therefore, for the mass production by the float process, it is preferable that the glass composition has a density close to the value mentioned above. Specifically, the density of the glass composition is preferably 2.45 to 2.55 g·cm$^{-3}$, and particularly preferably 2.47 to 2.53 g·cm$^{-3}$.

(Elastic Modulus: E)

When a glass substrate is subjected to chemical strengthening by ion exchange, it may be bent. It is preferable that the glass composition have a high elastic modulus to reduce this bending. According to the present invention, it is possible to increase the elastic modules (Young's modulus: E) of the glass composition to 70 GPa or more, and even to 72 GPa or more.

(Thermal Expansion Coefficient: α)

According to the present invention, it is possible to provide a glass composition having a linear thermal expansion coefficient in a range of $95 \times 10^{-7}$/° C. to $112 \times 10^{-7}$/° C. in a temperature range of 50 to 350° C. The glass composition having a linear thermal expansion coefficient in this range has the advantage of being less susceptible to bending or distortion when it is attached to a material having a higher linear thermal expansion coefficient than the linear thermal expansion coefficients ($70 \times 10^{-7}$/° C. to $100 \times 10^{-7}$/° C.) of common glass members. According to a preferred embodiment of the present invention, it is possible to provide a glass composition having a linear thermal expansion coefficient in a range of $100 \times 10^{-7}$/° C. or more in a temperature range of 50 to 350° C.

(Crack Initiation Load: Rc)

Cover glasses of displays are expected to be resistant to scratching and cracking. For the glass composition of the present invention, the crack initiation load determined by a test described later was used as a measure of the resistance to scratching and cracking of the glass surface. The crack initiation load of the strengthened glass article of the present invention is 3.9 kgf (kilogram force) or more, and can be increased to 4 kgf or more, to 5 kgf or more in some cases, and even to 5.2 kgf or more.

The chemical strengthening of the glass composition is described below.

(Conditions of Chemical Strengthening and Compressive Stress Layer)

Chemical strengthening of the glass composition of the present invention can be performed by bringing the glass composition containing sodium into contact with a molten salt containing monovalent cations, preferably potassium ions, having an ionic radius larger than that of sodium ions, so as to allow ion exchange to take place between sodium ions in the glass composition and the monovalent cations in the form of replacement of the sodium ions by the monovalent cations. Thus, a compressive stress layer having a surface compressive stress is formed.

A typical example of the molten salt is potassium nitrate. A molten salt mixture of potassium nitrate and sodium nitrate also can be used, but it is preferable to use potassium nitrate alone because it is difficult to control the concentration of a molten salt mixture.

The surface compressive stress and the depth of the compressive stress layer of a strengthened glass article can be controlled not only by the glass composition of the article but also by the temperature of the molten salt and the treatment time in the ion exchange treatment.

It is possible to obtain a strengthened glass article having a compressive stress layer with a very high crack initiation load, a moderately large thickness, and a moderately high surface compressive stress by bringing the glass composition of the present invention into contact with a molten salt of potassium nitrate. Specifically, it is possible to obtain a strengthened glass article having a compressive stress layer with a surface compressive stress of 900 MPa or more and a depth of 25 µm or more, and in addition, with a crack initiation load of 3.9 kgf or more, further 5 kgf or more, and even 6 kgf in some cases.

Since this strengthened glass article has a very high crack initiation load, its surface is resistant to cracking and scratching and has a strength suitable for use as a cover glass of a display.

It is also possible to obtain a strengthened glass article having a compressive stress layer with a very high surface compressive stress and a very large thickness by bringing the glass composition of the present invention into contact with a molten salt of potassium nitrate. Specifically, it is possible to obtain a strengthened glass article having a compressive stress layer with a surface compressive stress of 1000 MPa or more, even 1200 MPa or more or 1400 MPa or more in some cases, and a thickness of 30 µm or more, even 40 µm or more or 50 µm or more in some cases.

Since this strengthened glass article has a very high surface compressive stress, its surface is resistant to scratching. In addition, since the strengthened glass article has a compressive stress layer with a very large thickness, even if the surface has a scratch, the scratch is less likely to develop into the glass article due to the presence of the compressive stress layer and thus is less likely to damage the strengthened glass article. This strengthened glass article has a strength suitable for use as a cover glass of a display.

According to the present invention, it is possible to provide a glass composition having a relatively low $T_4$, suitable for production by the float process, and advantageous in forming glass into a thin glass sheet for use as a cover glass of a display.

The strengthened glass article obtained by chemically strengthening the glass composition of the present invention is suitable for use as a cover glass of a liquid crystal display, an organic EL display, a touch-panel display, or the like for an electronic device. It should be noted that the glass composition of the present invention does not necessarily have to be subjected to chemical strengthening treatment, and the untreated glass composition also can be used as a substrate for an electronic device or the like.

EXAMPLES

Hereinafter, the present invention will be described in more detail by way of examples and comparative examples.

(Preparation of Glass Compositions)

As commonly available glass raw materials such as silica, titanium oxide, alumina, sodium carbonate, potassium carbonate, basic magnesium carbonate, calcium carbonate, strontium carbonate, and barium carbonate were used to prepare glass formulations (batches) having the glass compositions shown in Tables 1 to 6. In some examples, sodium sulfate was used instead of sodium carbonate. In Comparative Examples 8 and 9, zirconium oxide, boron oxide, and tin (IV) oxide were further added to the glass formulations. The batches thus prepared were each put into a platinum crucible and heated in an electric furnace at 1550° C. for 4 hours. Thus, a molten glass was obtained. Next, the molten glass was poured on an iron plate for cooling to obtain a glass plate. Next, this glass plate was again placed in the electric furnace at 600° C. for 2 hours. Then, the furnace was turned off to slowly cool the glass plate to room temperature. Thus, a glass sample was obtained.

For each glass sample, the glass transition temperature Tg, the glass softening point Ts, the working temperature $T_4$, the melting temperature $T_2$, the liquidus temperature TL, the thermal expansion coefficient α, the density d, and the Young's modulus E were measured.

The glass transition temperature Tg and the thermal expansion coefficient α were measured using a differential thermal analyzer (Thermoflex TMA 8140, manufactured by Rigaku Corporation). The working temperature $T_4$ and the melting temperature $T_2$ were measured by a platinum ball pulling-up method. The density d was measured by an Archimedes method. The Young's modulus E was measured according to JIS (Japanese Industrial Standards) R 1602.

The liquidus temperature TL was measured in the following manner. The glass sample was pulverized and sieved. Glass particles that passed through a 2380-µm mesh sieve but retained on a 1000-µm mesh sieve were obtained. These glass particles were immersed in ethanol and subjected to ultrasonic cleaning, followed by drying in a thermostat. 25 g of the glass particles were placed in a platinum boat having a width of 12 mm, a length of 200 mm and a depth of 10 mm so as to obtain a measurement sample with a constant thickness. This platinum boat was placed in an electric furnace (a temperature gradient furnace) with a temperature gradient from about 850 to 1200° C. for 24 hours. Then, the measurement sample was observed using an optical microscope with a magnification of 100, and the highest temperature in a region where devitrification was observed was determined to be the liquidus temperature of the sample. In all Examples and Comparative Examples, glass particles in the measurement samples were fused together to form rods in the temperature gradient furnace.

(Production of Strengthened Glass)

The glass sample thus obtained was cut into pieces of 25 mm×35 mm. Both surfaces of each piece were polished with alumina abrasive grains and further mirror-polished with cerium oxide abrasive grains. Thus, two or more 5 mm-thick glass blocks having surfaces with a surface roughness Ra of 2 nm or less (a surface roughness Ra according to JIS B 0601-1994) were obtained for each composition. These glass blocks were immersed in a molten salt of potassium nitrate at predetermined temperatures ranging from 380° C. to 420° C., respectively, for 4 to 8 hours so as to allow ion exchange (I/E) to take place and thus to chemically strengthen the glass blocks. After the chemical strengthening treatment, the glass blocks were washed with hot water at 80° C. Thus, strengthened glass blocks were obtained.

In order to reduce the thermal shock applied to the glass blocks, they were preheated before being immersed in the molten salt and were slowly cooled after being immersed in the molten salt (that is, after being removed from the molten salt). Preheating was performed by placing the glass blocks in a space above the level of the molten salt in a container for 10 minutes. Slow cooling was also performed in the same manner as preheating. This slow cooling also has the effect of returning the molten salt remaining on the removed glass blocks as much as possible to the molten salt container.

For the strengthened glass blocks thus obtained, the surface compressive stress CS and the compression depth (the depth of the compressive stress layer) DOL were measured using a surface stress meter "FSM-6000" manufactured by Orihara Industrial Co., Ltd. Tables 1 to 6 collectively show the results.

(Evaluation of Crack Initiation Load Rc)

For some of the strengthened glass blocks obtained as described above, the crack initiation load was evaluated. The crack initiation load was calculated in the following manner using a Vickers hardness tester manufactured by Akashi Corporation. First, a Vickers indenter was pressed against the surface of the glass sample and applied a load of 1 kgf thereto for 15 seconds. 5 minutes after removal of the load, the number of cracks emanating from the corners of a square indentation on the surface of the glass sample was counted. This counting was repeated 10 times, and the total number of cracks was divided by 40, which is the total number of the corners of the indentation for 10 times, so as to calculate the crack occurrence probability P. The level of the load applied was increased to 2 kgf, 5 kgf, 10 kgf, and 20 kgf step by step, and the crack occurrence probability P was calculated at each of the loads in the same manner as described above. Thus, the two adjacent loads WH and WL, between which the probability of 50% (P=50%) occurred, and the crack occurrence probabilities PH and PL at these two adjacent loads (PL<50%<PH) were obtained. The load at which a straight line connecting two points (WH, PH) and (WL, PL) passed through the point of P=50% was obtained and defined as the crack initiation load Rc. Tables 1 to 6 collectively show the results.

In most Examples, the glass transition temperatures Tg were 610° C. or less and the working temperatures $T_4$ were 1100° C. or less. In some Examples, the melting temperatures $T_2$ measured were 1550° C. or less. In many Examples, the differences $T_4$-TL each obtained by subtracting the liquidus temperature TL from the working temperature $T_4$ were −1° C. or more. In Examples, the densities d were 2.48 to 2.52 g·cm$^{-3}$.

In all Examples, strengthened glass articles each having a compressive stress layer with a very high surface compressive stress (1100 MPa or more) and a moderately large thickness (25 μm or more) and strengthened glass articles each having a compressive stress layer with a very large thickness (30 μm or more) and a moderately high surface compressive stress (900 to 1100 MPa) could be obtained. In some Examples, strengthened glass articles each having a compressive stress layer with a very high surface compressive stress (1000 MPa or more) and a very large thickness (30 μm or more) could be obtained. In some other Examples, strengthened glass articles each having a compressive stress layer with an extremely high surface compressive stress (1200 MPa or more or 1400 MPa or more) and strengthened glass articles each having a compressive stress layer with an extremely large thickness (40 μm or more or 50 μm or more) and a moderately high surface compressive stress (900 to 1100 MPa) could be obtained.

Furthermore, in all Examples, strengthened glass articles each having a compressive stress layer with a surface compressive stress of 900 MPa or more and a depth of 25 μm or more, and in addition, with a high crack initiation load (3.9 kgf or more) could be obtained. In some of them, strengthened glass articles each having a compressive stress layer with a very high crack initiation load of 5 kgf or more, even 6 kgf or more in some cases could be obtained.

By contrast, in Comparative Examples 1 to 5, the surface compressive stresses were less than 900 MPa.

In Comparative Examples 6 to 9, no strengthened glass article having a compressive surface layer satisfying all of the requirements: a crack initiation load of 3.9 kgf or more; a surface compressive stress of 900 MPa or more; and a thickness of 2.5 μm or more, could be obtained.

TABLE 1

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Composition mol % | $SiO_2$ | 58.0 | 58.3 | 59.0 | 60.0 | 60.0 | 60.0 | 60.0 | 60.5 | 60.5 | 60.5 | 60.5 | 60.5 | 60.5 |
| | $ZrO_2$ | 0 | 0 | 0 | 0 | 0 | 0 | 0 | 0 | 0 | 0 | 0 | 0 | 0 |
| | $TiO_2$ | 0 | 0 | 0 | 0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 | 0 | 0 | 0 |
| | $Al_2O_3$ | 9.7 | 9.8 | 11.5 | 11.0 | 11.5 | 11.5 | 12.0 | 8.1 | 8.6 | 8.8 | 9.0 | 9.1 | 9.2 |
| | MgO | 10.4 | 10.1 | 8.2 | 7.5 | 8.2 | 8.2 | 7.2 | 9.5 | 9.0 | 9.1 | 9.1 | 8.5 | 7.9 |
| | CaO | 0.4 | 0.6 | 0.3 | 0 | 0.3 | 0.3 | 0.3 | 0.4 | 0.4 | 0.4 | 0.4 | 0.4 | 0.4 |
| | SrO | 0.5 | 0 | 0 | 0 | 0 | 0 | 0 | 0 | 0 | 0 | 0 | 0 | 0 |

TABLE 1-continued

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| | $Na_2O$ | 20.5 | 20.8 | 18.5 | 21.5 | 17.5 | 18.5 | 18.5 | 21.0 | 21.0 | 21.0 | 20.8 | 21.2 | 21.8 |
| | $K_2O$ | 0.5 | 0.4 | 2.5 | 0 | 2.5 | 1.5 | 2.0 | 0.5 | 0.5 | 0.2 | 0.2 | 0.3 | 0.2 |
| | $SnO_2$ | 0 | 0 | 0 | 0 | 0 | 0 | 0 | 0 | 0 | 0 | 0 | 0 | 0 |
| | $R_2O$ | 21.0 | 21.2 | 21.0 | 21.5 | 20.0 | 20.0 | 20.5 | 21.5 | 21.5 | 21.2 | 21.0 | 21.5 | 22.0 |
| TL/° C. | | 1071 | 1030 | 1037 | 967 | 1038 | 1022 | 1005 | 1020 | 1009 | 1008 | 1047 | 995 | 1026 |
| $T_2$/° C. | | 1474 | 1483 | 1570 | 1566 | 1602 | 1597 | 1610 | 1486 | 1501 | 1508 | 1516 | 1514 | 1512 |
| $T_4$/° C. | | 1074 | 1079 | 1140 | 1129 | 1159 | 1153 | 1165 | 1071 | 1082 | 1086 | 1092 | 1093 | 1092 |
| Tg/° C. | | 577 | 579 | 587 | 589 | 596 | 600 | 596 | 554 | 558 | 564 | 573 | 563 | 564 |
| $\alpha/\times 10^{-7}$° $C.^{-1}$ | | 106 | 110 | 109 | 104 | 106 | 103 | 105 | 108 | 107 | 106 | 106 | 104 | 106 |
| d/g · $cm^{-3}$ | | 2.51 | 2.50 | 2.49 | 2.49 | 2.49 | 2.49 | 2.49 | 2.49 | 2.49 | 2.49 | 2.49 | 2.49 | 2.49 |
| E/GPa | | 73.8 | 73.3 | 74.1 | 72.3 | 74.4 | 74.2 | 74.1 | 71.8 | 71.9 | 72.1 | 72.5 | 72.1 | 71.7 |
| Highest crack initiation load | Rc/kgf | 4.9 | 5.3 | 4.8 | 5.3 | 4.9 | 5.2 | 5.3 | 5.6 | 5.7 | 5.8 | 5.2 | 5.9 | 5.5 |
| | CS/MPa | 1122 | 1070 | 1155 | 1106 | 1174 | 1224 | 1187 | 952 | 960 | 1046 | 1000 | 988 | 975 |
| | DOL/μm | 27.7 | 30.3 | 32.8 | 27.3 | 31.7 | 28.3 | 28.7 | 28.1 | 26.4 | 27.2 | 31.4 | 26.2 | 27.0 |
| | I/E conditions | 420° C. 4 hr | 420° C. 4 hr | 400° C. 4 hr | 400° C. 4 hr | 400° C. 4 hr | 400° C. 4 hr | 400° C. 4 hr | 400° C. 4 hr | 400° C. 4 hr | 400° C. 4 hr | 420° C. 4 hr | 400° C. 4 hr | 400° C. 4 hr |
| CS ≥1000 MPa and DOL ≥30 μm | CS/MPa | 1108 | 1070 | 1134 | 1091 | 1123 | 1181 | 1076 | — | — | 1016 | 1000 | — | 1030 |
| | DOL/μm | 33.9 | 30.3 | 42.0 | 33.4 | 38.3 | 36.0 | 41.3 | — | — | 33.3 | 31.4 | — | 29.6 |
| | I/E conditions | 420° C. 6 hr | 420° C. 4 hr | 420° C. 4 hr | 400° C. 6 hr | 420° C. 4 hr | 420° C. 4 hr | 420° C. 4 hr | — | — | 400° C. 6 hr | 420° C. 4 hr | — | 380° C. 8 hr |
| DOL ≥25 μm and particularly high CS | CS/MPa | 1259 | 1323 | 1155 | 1106 | 1174 | 1224 | 1187 | 1031 | 1050 | 1046 | 1109 | 988 | 1030 |
| | DOL/μm | 28.0 | 27.0 | 32.8 | 27.3 | 31.7 | 28.3 | 28.7 | 28.5 | 26.1 | 27.2 | 26.2 | 26.2 | 29.6 |
| | I/E conditions | 400° C. 6 hr | 400° C. 6 hr | 400° C. 4 hr | 400° C. 4 hr | 400° C. 4 hr | 400° C. 4 hr | 400° C. 4 hr | 380° C. 8 hr | 380° C. 8 hr | 400° C. 4 hr | 380° C. 8 hr | 400° C. 4 hr | 380° C. 8 hr |
| CS ≥900 MPa and particularly deep DOL | CS/MPa | 1082 | 1020 | 1051 | 920 | 1033 | 1087 | 1036 | 922 | 936 | 943 | 925 | 975 | 955 |
| | DOL/μm | 39.2 | 48.6 | 59.4 | 52.0 | 56.5 | 50.9 | 58.4 | 39.8 | 37.4 | 45.0 | 44.3 | 37.0 | 38.2 |
| | I/E conditions | 420° C. 8 hr | 420° C. 8 hr | 420° C. 8 hr | 420° C. 8 hr | 420° C. 8 hr | 420° C. 8 hr | 420° C. 8 hr | 400° C. 8 hr | 400° C. 8 hr | 420° C. 8 hr | 420° C. 8 hr | 400° C. 8 hr | 400° C. 8 hr |

TABLE 2

| | | Examples | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Composition mol % | $SiO_2$ | 60.5 | 61.0 | 61.0 | 61.0 | 61.0 | 61.0 | 61.0 | 61.8 | 61.8 | 61.8 | 62.0 | 62.4 | 60.0 |
| | $ZrO_2$ | 0 | 0 | 0 | 0 | 0 | 0 | 0 | 0 | 0 | 0 | 0 | 0 | 0 |
| | $TiO_2$ | 0 | 0 | 0 | 0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 | 0 | 0 | 0 |
| | $Al_2O_3$ | 9.2 | 8.5 | 8.5 | 8.5 | 8.8 | 11.5 | 11.5 | 8.3 | 8.3 | 8.4 | 10.5 | 11.3 | 9.3 |
| | MgO | 7.9 | 8.6 | 9.1 | 8.9 | 8.3 | 7.2 | 7.2 | 8.5 | 8.2 | 7.9 | 7.5 | 7.2 | 9.3 |
| | CaO | 0.4 | 0.4 | 0.4 | 0.4 | 0.4 | 0.3 | 0.3 | 0.4 | 0.7 | 0.4 | 0 | 0.3 | 0.4 |
| | SrO | 0 | 0 | 0 | 0 | 0 | 0 | 0 | 0 | 0 | 0 | 0 | 0 | 0 |
| | $Na_2O$ | 21.3 | 20.9 | 20.8 | 21.0 | 21.0 | 17.5 | 18.5 | 20.8 | 20.8 | 21.3 | 20.0 | 18.8 | 21.0 |
| | $K_2O$ | 0.7 | 0.6 | 0.2 | 0.2 | 0.5 | 2.5 | 1.5 | 0.2 | 0.2 | 0.2 | 0 | 0 | 0 |
| | $SnO_2$ | 0 | 0 | 0 | 0 | 0 | 0 | 0 | 0 | 0 | 0 | 0 | 0 | 0 |
| | $R_2O$ | 22.0 | 21.5 | 21.0 | 21.2 | 21.5 | 20.0 | 20.0 | 21.0 | 21.0 | 21.5 | 20.0 | 18.8 | 21.0 |
| TL/° C. | | 1097 | 999 | 1007 | 922 | 1033 | 1011 | 996 | 984 | 965 | 974 | 873 | 974 | 1013 |
| $T_2$/° C. | | 1515 | 1510 | 1513 | 1498 | 1518 | 1625 | 1620 | 1525 | 1518 | 1523 | 1612 | 1650 | 1512 |
| $T_4$/° C. | | 1072 | 1087 | 1088 | 1071 | 1094 | 1173 | 1168 | 1094 | 1093 | 1096 | 1152 | 1181 | 1091 |
| Tg/° C. | | 557 | 555 | 563 | 566 | 558 | 591 | 596 | 556 | 557 | 553 | 594 | 612 | 574 |
| $\alpha/\times 10^{-7}$° $C.^{-1}$ | | 109 | 107 | 105 | 106 | 107 | 106 | 103 | 107 | 109 | 106 | 110 | 95 | 105 |
| d/g · $cm^{-3}$ | | 2.49 | 2.49 | 2.49 | 2.49 | 2.49 | 2.48 | 2.48 | 2.48 | 2.49 | 2.49 | 2.48 | 2.47 | 2.49 |
| E/GPa | | 71.8 | 71.8 | 72.0 | 71.9 | 71.8 | 74.1 | 73.9 | 71.7 | 72.1 | 71.4 | 72.5 | 73.8 | 72.6 |
| Highest crack initiation load | Rc/kgf | 6.0 | 6.0 | 5.9 | 5.9 | 6.0 | 5.4 | 5.7 | 6.4 | 6.9 | 6.4 | 5.6 | 6.2 | 5.6 |
| | CS/MPa | 960 | 984 | 1044 | 1024 | 955 | 1187 | 1173 | 944 | 993 | 928 | 1101 | 1208 | 1041 |
| | DOL/μm | 28.5 | 28.4 | 25.5 | 26.0 | 27.4 | 32.9 | 29.6 | 25.4 | 25.0 | 26.5 | 26.4 | 30.3 | 30.0 |
| | I/E conditions | 400° C. 4 hr | 400° C. 4 hr | 400° C. 4 hr | 400° C. 4 hr | 400° C. 4 hr | 400° C. 4 hr | 400° C. 4 hr | 400° C. 4 hr | 400° C. 4 hr | 400° C. 4 hr | 400° C. 4 hr | 420° C. 4 hr | 420° C. 4 hr |
| CS ≥1000 MPa and DOL ≥30 μm | CS/MPa | 1027 | — | 1014 | 990 | — | 1112 | 1111 | — | — | — | 1009 | 1208 | 1041 |
| | DOL/μm | 30.1 | — | 31.2 | 31.8 | — | 42.0 | 37.2 | — | — | — | 34.0 | 30.3 | 30.0 |
| | I/E conditions | 380° C. 8 hr | — | 400° C. 6 hr | 400° C. 6 hr | — | 420° C. 4 hr | 420° C. 4 hr | — | — | — | 420° C. 4 hr | 420° C. 4 hr | 420° C. 4 hr |
| DOL ≥25 μm and particularly high CS | CS/MPa | 1027 | 984 | 1044 | 1100 | 955 | 1187 | 1173 | 944 | 993 | 980 | 1101 | 1251 | 1193 |
| | DOL/μm | 30.1 | 28.4 | 25.5 | 24.7 | 27.4 | 32.9 | 29.6 | 25.4 | 25.0 | 30.5 | 26.4 | 28.7 | 27.5 |
| | I/E conditions | 380° C. 8 hr | 400° C. 4 hr | 400° C. 4 hr | 380° C. 8 hr | 400° C. 4 hr | 400° C. 4 hr | 400° C. 4 hr | 400° C. 4 hr | 400° C. 4 hr | 380° C. 8 hr | 400° C. 4 hr | 400° C. 6 hr | 400° C. 6 hr |

TABLE 2-continued

| | | Examples | | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 | 26 |
| CS ≥900 MPa and particularly deep DOL | CS/MPa | 947 | 905 | 908 | 922 | 933 | 1072 | 1031 | 933 | 951 | 900 | 980 | 1186 | 1011 |
| | DOL/μm | 40.3 | 35.2 | 44.6 | 39.6 | 38.7 | 59.4 | 53.7 | 35.9 | 35.3 | 37.5 | 48.1 | 42.9 | 42.5 |
| | I/E conditions | 400° C. 8 hr | 420° C. 4 hr | 420° C. 8 hr | 420° C. 6 hr | 400° C. 8 hr | 420° C. 8 hr | 420° C. 8 hr | 400° C. 8 hr | 400° C. 8 hr | 400° C. 8 hr | 420° C. 8 hr | 420° C. 8 hr | 420° C. 8 hr |

TABLE 3

| | | Examples | | | | | | | | | | | | |
|---|---|---|---|---|---|---|---|---|---|---|---|---|---|
| | | 27 | 28 | 29 | 30 | 31 | 32 | 33 | 34 | 35 | 36 | 37 | 38 | 39 |
| Composition mol % | $SiO_2$ | 57.0 | 57.0 | 57.0 | 60.0 | 61.0 | 58.0 | 58.0 | 58.0 | 58.0 | 58.0 | 58.3 | 58.5 | 58.5 |
| | $ZrO_2$ | 0 | 0 | 0 | 0 | 0 | 0 | 0.5 | 0 | 0 | 0 | 0 | 0 | 0 |
| | $TiO_2$ | 0 | 0 | 0 | 0 | 0 | 0 | 0 | 0.5 | 0 | 0 | 0 | 0 | 0 |
| | $B_2O_3$ | 0 | 0 | 0 | 0 | 0 | 0 | 0 | 0 | 0 | 0 | 0 | 0 | 0 |
| | $Al_2O_3$ | 12.0 | 11.0 | 10.0 | 7.8 | 8.5 | 9.7 | 9.7 | 9.7 | 9.7 | 11.5 | 9.8 | 9.7 | 10.0 |
| | MgO | 7.2 | 9.6 | 12.0 | 10.8 | 8.9 | 10.9 | 10.4 | 10.4 | 10.3 | 9.6 | 9.9 | 10.1 | 9.8 |
| | CaO | 0.3 | 0.4 | 0.5 | 0.4 | 0.4 | 0.4 | 0.4 | 0.4 | 1.0 | 0.4 | 0.8 | 0.4 | 0.4 |
| | SrO | 0 | 0 | 0 | 0 | 0 | 0 | 0 | 0 | 0 | 0 | 0 | 0 | 0 |
| | $Na_2O$ | 23.5 | 22.0 | 19.0 | 20.2 | 21.0 | 20.5 | 20.5 | 20.5 | 20.5 | 17.5 | 20.8 | 21.0 | 21.0 |
| | $K_2O$ | 0 | 0 | 1.5 | 0.8 | 0.2 | 0.5 | 0.5 | 0.5 | 0.5 | 3.0 | 0.4 | 0.3 | 0.3 |
| | $SnO_2$ | 0 | 0 | 0 | 0 | 0 | 0 | 0 | 0 | 0 | 0 | 0 | 0 | 0 |
| | $R_2O$ | 23.5 | 22.0 | 20.5 | 21.0 | 21.2 | 21.0 | 21.0 | 21.0 | 21.0 | 20.5 | 21.2 | 21.3 | 21.3 |
| TL/° C. | | 971 | 1026 | 1104 | 1058 | 1002 | 1074 | 1096 | 1064 | 1037 | 1076 | 1056 | 1006 | 1020 |
| $T_2$/° C. | | 1501 | 1483 | 1474 | 1472 | 1511 | 1480 | 1481 | 1471 | 1467 | 1552 | 1479 | 1488 | 1497 |
| $T_4$/° C. | | 1099 | 1083 | 1074 | 1061 | 1087 | 1073 | 1074 | 1074 | 1072 | 1130 | 1078 | 1079 | 1086 |
| Tg/° C. | | 579 | 587 | 589 | 557 | 560 | 580 | 588 | 577 | 571 | 594 | 578 | 578 | 580 |
| $\alpha/\times 10^{-7}$ °C.$^{-1}$ | | 108 | 107 | 111 | 108 | 106 | 105 | 106 | 106 | 101 | 111 | 112 | 105 | 107 |
| d/q · cm$^{-3}$ | | 2.50 | 2.50 | 2.51 | 2.49 | 2.49 | 2.50 | 2.51 | 2.51 | 2.51 | 2.51 | 2.50 | 2.50 | 2.50 |
| E/GPa | | 72.5 | 73.3 | 74.6 | 72.3 | 71.9 | 73.4 | 74.2 | 73.6 | 73.7 | 75.0 | 75.1 | 73.0 | 73.0 |
| Highest crack initiation load | Rc/kgf | 5.4 | 4.8 | 3.9 | 5.1 | 5.9 | 4.5 | 4.2 | 4.9 | 5.9 | 4.2 | 5.7 | 5.0 | 5.0 |
| | CS/MPa | 1220 | 1161 | 1193 | 886 | 963 | 1110 | 1186 | 1126 | 1093 | 1249 | 1074 | 1033 | 1089 |
| | DOL/μm | 28.5 | 30.9 | 28.7 | 35.1 | 35.6 | 30.1 | 29.1 | 29.6 | 28.1 | 31.7 | 30.1 | 30.9 | 31.8 |
| | I/E conditions | 400° C. 4 hr | 420° C. 4 hr | 420° C. 4 hr | 420° C. 4 hr | 400° C. 4 hr | 420° C. 4 hr | 420° C. 4 hr | 420° C. 4 hr | 420° C. 4 hr | 400° C. 4 hr | 420° C. 4 hr | 420° C. 4 hr | 420° C. 4 hr |
| CS ≥1000 MPa and DOL ≥30 μm | CS/MPa | 1064 | 1161 | 1179 | 1001 | — | 1110 | 1180 | 1114 | 1075 | 1062 | 1074 | 1033 | 1089 |
| | DOL/μm | 39.1 | 30.9 | 35.1 | 32.7 | — | 30.1 | 35.6 | 36.3 | 34.4 | 39.4 | 30.1 | 30.9 | 31.8 |
| | I/E conditions | 420° C. 4 hr | 420° C. 4 hr | 420° C. 6 hr | 400° C. 8 hr | — | 420° C. 4 hr | 420° C. 6 hr | 420° C. 6 hr | 420° C. 6 hr | 420° C. 4 hr | 420° C. 4 hr | 420° C. 4 hr | 420° C. 4 hr |
| DOL ≥25 μm and particularly high CS | CS/MPa | 1220 | 1318 | 1356 | 1011 | 963 | 1280 | 1254 | 1243 | 1476 | 1249 | 1389 | 1243 | 1251 |
| | DOL/μm | 28.5 | 28.3 | 28.1 | 28.3 | 35.6 | 26.9 | 25.7 | 27.7 | 24.7 | 31.7 | 26.3 | 27.8 | 28.3 |
| | I/E conditions | 400° C. 4 hr | 400° C. 6 hr | 400° C. 6 hr | 400° C. 6 hr | 400° C. 4 hr | 400° C. 6 hr | 400° C. 6 hr | 400° C. 6 hr | 400° C. 6 hr | 400° C. 4 hr | 400° C. 6 hr | 400° C. 6 hr | 400° C. 6 hr |
| CS ≥900 MPa and particularly deep DOL | CS/MPa | 1034 | 1141 | 1173 | 904 | 922 | 1070 | 1164 | 1104 | 1053 | 1020 | 1034 | 1000 | 1049 |
| | DOL/μm | 55.2 | 43.7 | 40.5 | 42.8 | 39.6 | 46.0 | 41.2 | 41.9 | 39.7 | 55.0 | 42.6 | 43.7 | 45.0 |
| | I/E conditions | 420° C. 8 hr | 420° C. 8 hr | 420° C. 8 hr | 420° C. 6 hr | 420° C. 6 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr |

TABLE 4

| | | Examples | | | | | | | | | | | | |
|---|---|---|---|---|---|---|---|---|---|---|---|---|---|
| | | 40 | 41 | 42 | 43 | 44 | 45 | 46 | 47 | 48 | 49 | 50 | 51 | 52 |
| Composition mol % | $SiO_2$ | 59.0 | 59.0 | 59.5 | 59.8 | 60.0 | 60.0 | 60.0 | 60.0 | 60.0 | 60.5 | 60.0 | 60.0 | 60.0 |
| | $ZrO_2$ | 0 | 0 | 0 | 0 | 0 | 0 | 0 | 0 | 0 | 0 | 0 | 0 | 0 |
| | $TiO_2$ | 0 | 0 | 0 | 0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 | 0 | 0 | 0 |
| | $Al_2O_3$ | 9.5 | 10.0 | 10.0 | 9.5 | 9.0 | 9.1 | 9.3 | 9.5 | 9.5 | 9.0 | 9.3 | 8.8 | 8.3 |
| | MgO | 9.8 | 9.6 | 9.6 | 9.6 | 9.6 | 10.1 | 10.3 | 9.2 | 10.1 | 9.7 | 9.8 | 10.3 | 10.3 |
| | CaO | 0.4 | 0.4 | 0.4 | 0.4 | 0.4 | 0.4 | 0.4 | 0.3 | 0.4 | 0.8 | 0.4 | 0.4 | 0.4 |
| | SrO | 0 | 0 | 0 | 0 | 0 | 0 | 0 | 0 | 0 | 0 | 0 | 0 | 0 |
| | $Na_2O$ | 21.0 | 20.5 | 20.0 | 20.3 | 20.5 | 19.4 | 19.4 | 20.5 | 19.5 | 18.8 | 20.4 | 20.2 | 21.0 |

TABLE 4-continued

| | | Examples | | | | | | | | | | | | |
|---|---|---|---|---|---|---|---|---|---|---|---|---|---|
| | | 40 | 41 | 42 | 43 | 44 | 45 | 46 | 47 | 48 | 49 | 50 | 51 | 52 |
| | $K_2O$ | 0.3 | 0.5 | 0.5 | 0.5 | 0.5 | 1.0 | 0.6 | 0.5 | 0.5 | 1.2 | 0.1 | 0.3 | 0 |
| | $SnO_2$ | 0 | 0 | 0 | 0 | 0 | 0 | 0 | 0 | 0 | 0 | 0 | 0 | 0 |
| | $R_2O$ | 21.3 | 21.0 | 20.5 | 20.8 | 21.0 | 20.4 | 20.0 | 21.0 | 20.0 | 20.0 | 20.5 | 20.5 | 21.0 |
| TL/° C. | | 1013 | 1031 | 1032 | 921 | 915 | 1001 | 1042 | 975 | 1051 | 927 | 1028 | 1042 | 1035 |
| $T_2$/° C. | | 1494 | 1512 | 1529 | 1517 | 1506 | 1517 | 1536 | 1523 | 1530 | 1522 | 1517 | 1504 | 1483 |
| $T_4$/° C. | | 1081 | 1095 | 1104 | 1095 | 1086 | 1094 | 1099 | 1098 | 1102 | 1100 | 1094 | 1083 | 1068 |
| Tg/° C. | | 574 | 581 | 585 | 576 | 571 | 572 | 579 | 576 | 585 | 575 | 579 | 574 | 565 |
| $\alpha/\times 10^{-7}$ °C.$^{-1}$ | | 107 | 106 | 105 | 102 | 108 | 106 | 104 | 106 | 104 | 111 | 104 | 105 | 106 |
| d/q · cm$^{-3}$ | | 2.50 | 2.50 | 2.49 | 2.49 | 2.49 | 2.49 | 2.49 | 2.49 | 2.49 | 2.49 | 2.49 | 2.49 | 2.49 |
| E/GPa | | 72.7 | 73.2 | 73.4 | 73.0 | 72.6 | 73.2 | 73.2 | 72.7 | 73.4 | 73.3 | 72.9 | 72.8 | 72.2 |
| Highest crack initiation load | Rc/kgf | 5.2 | 5.1 | 5.2 | 5.3 | 5.4 | 5.1 | 5.1 | 5.3 | 5.2 | 6.0 | 5.4 | 5.2 | 5.4 |
| | CS/MPa | 1014 | 1038 | 1062 | 1015 | 983 | 1012 | 1042 | 989 | 1070 | 1005 | 1075 | 1049 | 1008 |
| | DOL/μm | 32.7 | 32.7 | 30.7 | 32.6 | 33.4 | 33.2 | 30.3 | 33.5 | 29.2 | 33.6 | 31.3 | 28.4 | 28.4 |
| | I/E conditions | 420° C. 4 hr | 420° C. 4 hr | 420° C. 4 hr | 420° C. 4 hr | 420° C. 4 hr | 420° C. 4 hr | 420° C. 4 hr | 420° C. 4 hr | 420° C. 4 hr | 420° C. 4 hr | 420° C. 4 hr | 420° C. 4 hr | 420° C. 4 hr |
| CS ≥1000 MPa and DOL ≥30 μm | CS/MPa | 1014 | 1038 | 1062 | 1015 | 1143 | 1012 | 1042 | 1140 | 1050 | 1005 | 1061 | 1035 | 1148 |
| | DOL/μm | 32.7 | 32.7 | 30.7 | 32.6 | 33.5 | 33.2 | 30.3 | 30.2 | 36.1 | 31.3 | 34.8 | 34.8 | 30.0 |
| | I/E conditions | 420° C. 4 hr | 420° C. 4 hr | 420° C. 4 hr | 420° C. 4 hr | 400° C. 8 hr | 420° C. 4 hr | 420° C. 4 hr | 400° C. 6 hr | 420° C. 6 hr | 420° C. 4 hr | 420° C. 6 hr | 420° C. 6 hr | 400° C. 8 hr |
| DOL ≥25 μm and particularly high CS | CS/MPa | 1213 | 1236 | 1246 | 1203 | 1161 | 1180 | 1233 | 1140 | 1243 | 1210 | 1186 | 1200 | 1169 |
| | DOL/μm | 28.3 | 29.1 | 28.4 | 28.7 | 29.1 | 29.5 | 26.9 | 30.2 | 26.9 | 26.5 | 26.3 | 27.0 | 25.8 |
| | I/E conditions | 400° C. 6 hr | 400° C. 6 hr | 400° C. 6 hr | 400° C. 6 hr | 400° C. 6 hr | 400° C. 6 hr | 400° C. 6 hr | 400° C. 6 hr | 400° C. 6 hr | 400° C. 6 hr | 400° C. 6 hr | 400° C. 6 hr | 400° C. 6 hr |
| CS ≥900 MPa and particularly deep DOL | CS/MPa | 1079 | 1002 | 1010 | 958 | 921 | 962 | 1001 | 945 | 1029 | 963 | 1045 | 1019 | 973 |
| | DOL/μm | 46.2 | 45.0 | 44.5 | 45.8 | 48.6 | 46.0 | 42.6 | 48.2 | 42.0 | 43.9 | 40.2 | 40.1 | 40.2 |
| | I/E conditions | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 8 hr |

TABLE 5

| | | Examples | | | | | | | | | |
|---|---|---|---|---|---|---|---|---|---|---|---|
| | | 53 | 54 | 55 | 56 | 57 | 58 | 59 | 60 | 61 | 62 |
| Composition mol % | $SiO_2$ | 60.0 | 59.0 | 60.0 | 60.0 | 59.0 | 60.0 | 60.0 | 60.0 | 60.0 | 59.0 |
| | $ZrO_2$ | 0 | 0 | 0 | 0 | 0 | 0 | 0 | 0 | 0 | 0 |
| | $TiO_2$ | 0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 |
| | $Al_2O_3$ | 8.3 | 10.3 | 8.8 | 7.8 | 8.3 | 7.8 | 8.8 | 8.3 | 8.3 | 10.3 |
| | MgO | 10.8 | 9.3 | 9.8 | 10.3 | 10.3 | 10.8 | 10.3 | 10.8 | 10.3 | 9.3 |
| | CaO | 0.4 | 0.4 | 0.4 | 0.4 | 0.4 | 0.4 | 0.4 | 0.4 | 0.4 | 0.4 |
| | SrO | 0 | 0 | 0 | 0 | 0 | 0 | 0 | 0 | 0 | 0 |
| | $Na_2O$ | 20.1 | 21.0 | 21.0 | 20.5 | 21.5 | 20.0 | 20.1 | 19.5 | 20.2 | 20.8 |
| | $K_2O$ | 0.4 | 0 | 0 | 1.0 | 0.5 | 1.0 | 0.4 | 1.0 | 0.8 | 0.2 |
| | $SnO_2$ | 0 | 0 | 0 | 0 | 0 | 0 | 0 | 0 | 0 | 0 |
| | $R_2O$ | 20.5 | 21.0 | 21.0 | 21.5 | 22.0 | 21.0 | 20.5 | 20.5 | 21.0 | 21.0 |
| TL/° C. | | 1055 | 1017 | 1024 | 1048 | 1041 | 1044 | 1061 | 1064 | 1047 | 1020 |
| $T_2$/° C. | | 1490 | 1518 | 1497 | 1469 | 1453 | 1473 | 1504 | 1493 | 1487 | 1520 |
| $T_4$/° C. | | 1072 | 1099 | 1079 | 1059 | 1052 | 1062 | 1084 | 1075 | 1073 | 1100 |
| Tg/° C. | | 569 | 586 | 569 | 550 | 554 | 556 | 573 | 566 | 568 | 587 |
| $\alpha/\times 10^{-7}$ °C.$^{-1}$ | | 106 | 104 | 105 | 110 | 110 | 109 | 105 | 107 | 107 | 104 |
| d/q · cm$^{-3}$ | | 2.49 | 2.49 | 2.49 | 2.50 | 2.50 | 2.50 | 2.49 | 2.49 | 2.49 | 2.49 |
| E/GPa | | 72.7 | 73.2 | 72.4 | 72.0 | 72.0 | 72.3 | 72.8 | 73.0 | 72.6 | 72.9 |
| Highest crack initiation load | Rc/kgf | 5.1 | 5.3 | 5.5 | 5.2 | 5.1 | 5.0 | 5.2 | 5.0 | 5.2 | 5.3 |
| | CS/MPa | 1028 | 1121 | 1024 | 1087 | 956 | 947 | 1007 | 1001 | 973 | 1112 |
| | DOL/μm | 28.0 | 29.7 | 29.2 | 25.1 | 32.5 | 31.6 | 30.7 | 30.4 | 31.6 | 30.5 |
| | I/E conditions | 420° C. 4 hr | 420° C. 4 hr | 420° C. 4 hr | 400° C. 4 hr | 420° C. 4 hr | 420° C. 4 hr | 420° C. 4 hr | 420° C. 4 hr | 420° C. 4 hr | 420° C. 4 hr |
| CS ≥1000 MPa and DOL ≥30 μm | CS/MPa | 1160 | 1105 | 1007 | 1087 | 1107 | 1088 | 1000 | 1001 | 1011 | 1112 |
| | DOL/μm | 30.1 | 34.3 | 36.3 | 25.1 | 33.8 | 33.7 | 35.2 | 30.4 | 33.7 | 30.5 |
| | I/E conditions | 400° C. 8 hr | 420° C. 6 hr | 420° C. 6 hr | 400° C. 4 hr | 400° C. 8 hr | 400° C. 6 hr | 420° C. 6 hr | 420° C. 4 hr | 400° C. 8 hr | 420° C. 4 hr |
| DOL ≥25 μm and particularly high CS | CS/MPa | 1184 | 1268 | 1181 | 1087 | 1125 | 1106 | 1116 | 1154 | 1029 | 1258 |
| | DOL/μm | 26.0 | 27.5 | 26.6 | 25.1 | 29.3 | 29.2 | 26.8 | 28.5 | 29.2 | 28.3 |
| | I/E conditions | 400° C. 6 hr | 400° C. 6 hr | 400° C. 6 hr | 400° C. 4 hr | 400° C. 6 hr | 400° C. 6 hr | 400° C. 6 hr | 400° C. 6 hr | 400° C. 6 hr | 400° C. 6 hr |
| CS ≥900 MPa and particularly deep DOL | CS/MPa | 998 | 1101 | 994 | 910 | 904 | 924 | 980 | 966 | 938 | 1092 |
| | DOL/μm | 39.6 | 42.0 | 41.3 | 33.6 | 45.9 | 38.7 | 38.0 | 42.9 | 44.7 | 43.1 |
| | I/E conditions | 420° C. 8 hr | 420° C. 8 hr | 420° C. 8 hr | 420° C. 4 hr | 420° C. 8 hr | 420° C. 6 hr | 420° C. 8 hr | 420° C. 6 hr | 420° C. 8 hr | 420° C. 8 hr |

TABLE 6

| | | Comparative Examples | | | | | | | | |
|---|---|---|---|---|---|---|---|---|---|---|
| | | 1 | 2 | 3 | 4 | 5 | 6 | 7 | 8 | 9 |
| Composition mol % | $SiO_2$ | 75.0 | 70.0 | 70.0 | 65.0 | 60.0 | 55.0 | 55.0 | 66.0 | 63.0 |
| | $ZrO_2$ | 0 | 0 | 0 | 0 | 0 | 0 | 0 | 0.01 | 2.04 |
| | $TiO_2$ | 0 | 0 | 0 | 0 | 0 | 0 | 0 | 0 | 0 |
| | $B_2O_3$ | 0 | 0 | 0 | 0 | 0 | 0 | 0 | 0.6 | 1.9 |
| | $Al_2O_3$ | 6.5 | 9.5 | 9.5 | 11.5 | 10.0 | 11.5 | 15.0 | 10.3 | 8.3 |
| | MgO | 2.5 | 2.2 | 2.5 | 2.5 | 9.7 | 12.5 | 9.7 | 5.8 | 3.2 |
| | CaO | 0 | 0.3 | 0 | 0 | 0.3 | 0 | 0.3 | 0.6 | 2.3 |
| | SrO | 0 | 0 | 0 | 0 | 0 | 0 | 0 | 0 | 0 |
| | $Na_2O$ | 16.0 | 15.3 | 18.0 | 21.0 | 13.2 | 21.0 | 20.0 | 14.2 | 15.6 |
| | $K_2O$ | 0 | 2.7 | 0 | 0 | 6.8 | 0 | 0 | 2.4 | 3.4 |
| | $SnO_2$ | 0 | 0 | 0 | 0 | 0 | 0 | 0 | 0.14 | 0.13 |
| | $R_2O$ | 16.0 | 18.0 | 18.0 | 21.0 | 20.0 | 21.0 | 20.0 | 16.6 | 19.0 |
| TL/° C. | | 864 | 877 | 861 | <833 | 1138 | >1200 | 1053 | <890 | <878 |
| $T_2$/° C. | | 1832 | 1794 | 1786 | 1701 | 1582 | 1471 | 1577 | >1613 | 1561 |
| $T_4$/° C. | | 1263 | 1264 | 1251 | 1213 | 1147 | 1072 | 1155 | >1131 | 1122 |
| Tg/° C. | | 549 | 557 | 577 | 578 | 583 | 607 | 647 | 606 | 569 |
| $\alpha/\times 10^{-7}$ °$C.^{-1}$ | | 85 | 98 | 90 | 98 | 113 | 101 | 97 | 92 | 103 |
| $d/q \cdot cm^{-3}$ | | 2.41 | 2.44 | 2.43 | 2.46 | 2.49 | 2.51 | 2.50 | 2.46 | 2.54 |
| E/GPa | | 69.9 | 72.1 | 71.1 | 71.2 | 75.0 | 74.4 | 76.5 | 72.9 | 75.4 |
| Highest crack initiation load | Rc/kgf | — | — | — | — | — | 2.7 | 3.8 | 5.6 | 3.2 |
| | CS/MPa | — | — | — | — | — | 1266 | 1519 | 970 | 1022 |
| | DOL/μm | — | — | — | — | — | 25.2 | 25.7 | 23.2 | 17.5 |
| | I/E conditions | — | — | — | — | — | 420° C. 4 hr | 420° C. 4 hr | 380° C. 4 hr | 380° C. 4 hr |
| CS ≥1000 MPa and DOL ≥30 μm | CS/MPa | — | — | — | — | — | 1240 | 1505 | Not achieved | 1011 |
| | DOL/μm | — | — | — | — | — | 30.9 | 31.5 | | 30.8 |
| | I/E conditions | — | — | — | — | — | 420° C. 6 hr | 420° C. 6 hr | | 420° C. 4 hr |
| DOL ≥25 μm and particularly high CS | CS/MPa | 585 | 737 | 775 | 845 | 870 | 1340 | 1519 | 970 | 1011 |
| | DOL/μm | 27.5 | 36.6 | 28.9 | 33.1 | 45.5 | 27.2 | 25.7 | 23.2 | 30.8 |
| | I/E conditions | 400° C. 4 hr | 400° C. 4 hr | 400° C. 4 hr | 400° C. 4 hr | 400° C. 4 hr | 400° C. 8 hr | 420° C. 4 hr | 380° C. 4 hr | 420° C. 4 hr |
| CS ≥900 MPa and particularly deep DOL | CS/MPa | 430 | 601 | 612 | 700 | 800 | 1230 | 1499 | 901 | 1011 |
| | DOL/μm | 51.2 | 67.6 | 53.2 | 62.2 | 75.7 | 35.6 | 36.3 | 47.4 | 30.8 |
| | I/E conditions | 420° C. 8 hr | 420° C. 8 hr | 420° C. 8 hr | 420° C. 8 hr | 420° C. 8 hr | 420° C. 8 hr | 420° C. 8 hr | 420° C. 8 hr | 420° C. 4 hr |

INDUSTRIAL APPLICABILITY

The present invention can provide a glass composition suitable for production by a float process and suitable for use, for example, in a cover glass for a display.

The invention claimed is:

1. A glass composition comprising, in mol %:
56 to 64% $SiO_2$;
6 to 12% $Al_2O_3$;
7 to 12% MgO;
0 to 1% CaO;
17 to 24% $Na_2O$; and
0 to 1.5% $K_2O$, wherein
a total content of $Li_2O$, $Na_2O$, and $K_2O$ is in a range of 18.5 to 24%, and
the glass composition is substantially free of $Li_2O$.

2. The glass composition according to claim 1, wherein a content of $Al_2O_3$ is 6 to 10 mol %.

3. The glass composition according to claim 1, wherein a temperature $T_4$ at which the glass composition has a viscosity of $10^4$ dPa·s is 1100° C. or less.

4. The glass composition according to claim 1, wherein a temperature $T_2$ at which the glass composition has a viscosity of $10^2$ dPa·s is 1550° C. or less.

5. The glass composition according to claim 1, wherein a difference obtained by subtracting a liquidus temperature TL from a temperature $T_4$ at which the glass composition has a viscosity of $10^4$ dPa·s is −10° C. or more.

6. The glass composition according to claim 1, consisting essentially of, in mol %:
57 to 64% $SiO_2$;
0 to 3% $B_2O_3$;
7 to 11% $Al_2O_3$;
7 to 12% MgO;
0 to 1% CaO;
19 to 22% $Na_2O$;
0 to 1.5% $K_2O$;
0 to 1% $TiO_2$;
0 to 1% $ZrO_2$;
0.02% or less total iron oxide in terms of $Fe_2O_3$;
0.1 to 0.3% $SO_3$; and
0 to 0.4% $SnO_2$, wherein
a total content of $Na_2O$ and $K_2O$ is in a range of 19 to 22%.

7. The glass composition according to claim 6, wherein the glass composition is substantially free of $B_2O_3$.

8. The glass composition according to claim 6, wherein the glass composition is substantially free of $TiO_2$.

9. A glass composition for chemical strengthening, wherein the glass composition for chemical strengthening is the glass composition according to claim 1 and is used in chemical strengthening treatment.

10. A strengthened glass article comprising a compressive stress layer formed as a surface of the strengthened glass article by bringing the glass composition according to claim 1 into contact with a molten salt containing monovalent cations having an ionic radius larger than that of sodium ions so as to allow ion exchange to take place between sodium ions contained in the glass composition and the monovalent cations.

11. The strengthened glass article according to claim 10, wherein the compressive stress layer has a surface compressive stress of 900 MPa or more and a depth of 25 μm or more, and in addition, has a crack initiation load of 3.9 kgf or more, the crack initiation load being defined as an indentation load at which cracks emanating from an indentation formed by a Vickers indenter occur with a probability of 50%.

12. The strengthened glass article according to claim 11, wherein the compressive stress layer has a surface compressive stress of 1000 MPa or more and a depth of 30 μm or more.

13. A cover glass for a display, the cover glass comprising the strengthened glass article according to claim 10.

* * * * *